(12) United States Patent
Hurst et al.

(10) Patent No.: US 7,137,276 B2
(45) Date of Patent: Nov. 21, 2006

(54) PROCESS FOR COATING GLASS

(75) Inventors: Simon James Hurst, Runcorn (GB); Kevin David Sanderson, Wigan (GB); Timothy Ian McKittrick, Southport (GB); David Rimmer, St Helens (GB)

(73) Assignee: Pilkington PLC, Merseyside (GB)

( * ) Notice: Subject to any disclaimer, the term of this patent is extended or adjusted under 35 U.S.C. 154(b) by 476 days.

(21) Appl. No.: 10/362,313

(22) PCT Filed: Aug. 20, 2001

(86) PCT No.: PCT/GB01/03723

§ 371 (c)(1),
(2), (4) Date: Feb. 20, 2003

(87) PCT Pub. No.: WO02/18287

PCT Pub. Date: Mar. 7, 2002

(65) Prior Publication Data

US 2004/0028911 A1    Feb. 12, 2004

(30) Foreign Application Priority Data

Sep. 1, 2000    (GB) ................................ 0021396.7

(51) Int. Cl.
*C23C 16/40* (2006.01)
*B32B 17/06* (2006.01)

(52) U.S. Cl. ........................ 65/60.1; 65/60.2; 65/60.51; 65/99.2; 427/226; 427/255.19; 427/255.391; 427/255.5; 428/426; 428/432

(58) Field of Classification Search ................. 65/60.1, 65/60.2, 60.5, 60.51, 99.2; 427/226, 255.19, 427/255.391, 255.5; 428/426, 432
See application file for complete search history.

(56) References Cited

U.S. PATENT DOCUMENTS

| 5,698,177 | A  | * | 12/1997 | Pratsinis et al. ............. 423/613 |
| 5,730,771 | A  | * | 3/1998  | Terneu et al. ................. 65/60.5 |
| 6,027,766 | A  | * | 2/2000  | Greenberg et al. .......... 427/226 |
| 6,103,363 | A  | * | 8/2000  | Boire et al. .................. 428/325 |
| 6,238,738 | B1 | * | 5/2001  | McCurdy ............... 427/255.19 |
| 6,312,131 | B1 | * | 11/2001 | Yamamoto et al. ......... 359/507 |
| 6,312,831 | B1 | * | 11/2001 | Crawley et al. ............. 428/633 |
| 6,846,556 | B1 | * | 1/2005  | Boire et al. ................. 428/325 |

FOREIGN PATENT DOCUMENTS

| WO | 97/07069 | * | 2/1997 |
| WO | 98/06675 | * | 2/1998 |

* cited by examiner

Primary Examiner—Sean Vincent
(74) Attorney, Agent, or Firm—Marshall & Melhorn, LLC

(57) ABSTRACT

A process for the production of durable photocatalytically active self-cleaning coating on glass by contacting a hot glass surface with a fluid mixture of titanium chloride, a source of oxygen and a tin precursor. The coating preferably comprises less than 10 atom % tin in the bulk of the coating and preferably there is a greater atomic percent tin in the surface of the coating than there is in the bulk of the coating. Preferably, the coating is durable to abrasion and humidity cycling.

25 Claims, No Drawings

PROCESS FOR COATING GLASS

TECHNICAL FIELD

The present invention relates to a process for the production of a durable photocatalytically active self-cleaning coated glass. In particular the present invention relates to a process for depositing a durable, photocatalytically active self-cleaning coating of titanium oxide containing tin on the surface of a glass substrate. The present invention also relates to a durable, photocatalytically active coated glass having a coating comprising titanium oxide containing tin.

BACKGROUND ART

It is known to deposit thin coatings having one or more layers with a variety of properties on to glass substrates. One property of interest is photocatalytic activity which arises by photogeneration, in a semi-conductor, of a hole-election pair when the semi-conductor is illuminated by light of a particular frequency. The hole-electron pair can be generated in sunlight and can react in humid air to form hydroxy and peroxy radicals on the surface of the semi-conductor. The radicals oxidise organic grime on the surface which both cleans the surface and increases the hydrophilic properties (i.e. wettability) of the surface. A hydrophilic surface is beneficial because water will wet the surface better, making the surface easier to clean with water containing little or no detergent. In addition, water droplets will spread over the surface reducing the distracting visual effects of rain or spray. Thus, photocatalytically active coated glass has a use in self-cleaning glass for windows.

Titanium dioxide may be deposited on to glass to form a transparent coating with photocatalytic properties. In WO 98/06675 a chemical vapour deposition process is described for depositing titanium oxide coatings on hot flat glass at high deposition rate. In EP 901 991 A2 a photocatalytically active titanium oxide coating deposited by DVD is disclosed.

Mixed oxide coatings of titanium with other metals are known. In GB 2 275 691 a glass substrate having a pyrolytically formed coating is described, characterised in that the coating comprises tin oxide and titanium oxide. The coating may be formed by contacting a hot glass substrate with a titanium containing precursor being the reaction product of octyleneglycol titanate and acetylacetonate together with a tin-containing coating precursor, for example tin dibutyl/diacetate. Similar mixed titanium/tin oxide coatings are disclosed in GB 2150044 and U.S. Pat. No. 4,687,687.

In WO 95/15816 sol gel processes for producing photocatalytically active titanium oxide coatings which contain tin oxide particles are described.

In WO 98/10186 it is stated that a photocatalytically active coating may contain one other type of mineral material for example an oxide of silicon (or mixture of oxides) of titanium, tin, zirconium or aluminium. It has been suggested in WO98/10186 that mixed oxides coatings containing titanium oxide or titanium oxide coatings may have advantageous optical properties for example by lowering the refractive index of the coating.

A problem arises with known photocatalytically active coatings based on titania in that the durability of the coating, especially to abrasion, may be poor. This is especially problematic because such coatings will often be used for their self-cleaning property and this use requires the coating to be on the outside surface of e.g. glazings where the coating may be particularly prone to abrasion.

The applicants have discovered that this problem may be addressed by depositing a titania coating containing tin on hot glass from a fluid containing a titanium precursor and a tin precursor.

DISCLOSURE OF INVENTION

The present invention accordingly provides a process for the production of a durable photocatalytically active self-cleaning coated glass comprising contacting the surface of a hot glass substrate with a fluid mixture comprising titanium chloride, a source of oxygen and a tin precursor thereby depositing a tin containing titanium oxide coating on the surface of the glass substrate.

Coated glasses produced by the process of the invention have surprisingly high durability, both to abrasion (as determined for example, by the European standard abrasion test as described in British Standard BS EN 1096 (Part 2, 1999)), and to temperature cycling in a humid atmosphere. Preferably, the coated glass is durable to abrasion such that the coated surface retains a photocatalytic activity after being subjected to 500 strokes of the European standard abrasion test.

Preferably, at least part of the fluid mixture contacts the surface of the glass substrate by flowing over the surface of the glass substrate or, more preferably, by flowing over the surface of a glass substrate which is moving relative to the coating apparatus.

The preferred titanium chloride comprises titanium tetrachloride because it is relatively cheap, obtainable in pure form and volatile (allowing good carry over to the glass surface). However, generally any titanium precursor having a chloro substituent may be used in the process of the invention.

Preferably, the tin precursor comprises a tin halide (i.e. a tin compound having a halo substituent), more preferably the tin precursor comprises a tin chloride and most preferably the tin precursor comprises dimethyl tin dichloride ($(CH_3)_2$ Sn $Cl_2$, DMT) or tin tetrachloride (Sn $Cl_4$). This is advantageous because these tin precursors are relatively cheap in bulk, obtainable in pure form and provide good carryover to the glass surface during deposition of the coating.

The source of oxygen preferably comprises an ester, especially a carboxylic acid ester. Usually, the ester will comprise a $C_1$ to $C_4$ acetate because these esters are relatively volatile providing relatively efficient incorporation of the ester in a carrier gas stream (this may be done, for example, by bubbling the carrier gas through the liquid ester). Most preferably the ester comprises ethyl acetate which is cheap and has low toxicity.

Usually, the glass substrate will comprise a soda-lime-silicate glass substrate.

If the glass substrate comprises a soda-lime-silicate glass substrate or another glass substrate comprising alkali metal ions, the process of the invention preferably further comprises depositing an alkali metal ion blocking underlayer on the surface of the glass substrate before depositing the coating of titanium oxide containing tin. This is advantageous because an alkali metal ion blocking underlayer reduces migration of alkali metal ions from the glass substrate into the photocatalytically active coating which could reduce the photocatalytic activity of the coating and/or generate haze. Preferred alkali metal ion blocking underlayers comprise a silicon oxide layer (which has similar retractive index to the glass substrate and so has little effect on the optical properties of the coated glass) or a double layer of tin oxide and silicon oxide. Alternatively, other alkali metal ion blocking layers known in the art may be used if desired.

The photocatalytically active coating may be deposited using spray deposition (in which the fluid mixture comprises liquid droplets) or chemical vapour deposition (CVD, in which the fluid mixture comprises a gaseous mixture). The preferred deposition process is CVD, thus, preferably the fluid mixture comprises a gaseous mixture.

Usually, the hot glass substrate will be at a temperature in the rage 500° C. to 750° C. which has been found in practice to be an especially suitable temperature range for depositing durable photocatalytically active coatings comprising titania.

At temperatures much lower than this the photocatalytic activity of coatings based on titania begins to drop off. At higher temperatures some kinds of glass (including soda-lime-silicate glass) may begin to soften. Preferably the hot glass substrate is at a temperature in the range 570° C. to 650° C.

The process will usually be performed at substantially atmospheric pressure.

It is advantageous if the process is performed during the float glass production process because this is especially suitable for producing large volumes of coated glass. In this case the process is preferably performed in the float bath.

In preferred embodiments of the invention the amount of tin in the bulk of the tin containing titanium oxide coating is below about 10 atom % (as determined by X-ray photoelectron spectroscopy, XPS), preferably below about 5 atom % and more preferably below about 2 atom %. At higher amounts of tin, there may be a reduction in photocatalytic activity of the coated glass. The amount of tin in the bulk of the coating will usually be above about 0.05 atom %. Thus, preferably the amount of tin in the bulk of the coating is in the range 0.05 atom % to 10 atom %, more preferably in the range 0.05 atom % to 5 atom % and most preferably in the range 0.05 atom % to 2 atom %. Thus, in another aspect, the present invention provides a process for depositing a tin containing titanium oxide coating on the surface of a hot glass substrate comprising contacting the surface of the glass substrate with a fluid mixture comprising a titanium precursor, a source of oxygen and a tin precursor characterised in that the amount of tin in the bulk of the tin containing titanium oxide coating is below 10 atom %. The tin content of the coatings appears to provide or contribute to the surprisingly high durability of coatings deposited according to the invention.

The applicants have unexpectedly discovered that in tin containing titanium oxide coatings deposited according to the invention, there is a greater atomic percent tin in the surface of the tin containing titanium oxide coating than there is in the bulk of the coating. This may be advantageous in providing greater increase in durability for a relatively small amount of tin since durability to abrasion, humidity or other factors is likely to depend most on the surface of a coating. The surface of the coating normally means approximately 10% of the thickness of the coating in terms of the total coating thickness.

Preferably, the atomic percent tin in the surface of the tin containing titanium oxide coating is at least twice that in the bulk of the coating.

The present invention provides in a further aspect a durable, photocatalytically active coated glass comprising a glass substrate having a coating comprising tin containing titanium oxide, the amount of tin in the bulk of the coating being below 10 atom %. The atomic percent tin in the surface of the coating is preferably at least twice that in the bulk of the coating, and is preferably above 0.05 atom %.

Coated glasses according to the invention have uses in many areas of glass use including as glazings in buildings (either in single glazing, multiple glazing or laminated glazing) or in vehicles (either in laminated glazings or otherwise).

Preferably, coated glasses according to the invention will have values of visible reflection measured on the coated side of 25% or lower, more preferably of 20% or lower and most preferably of 15% or lower.

Coated glasses according to the invention are photocatalytically active which is advantageous because the amount of contaminants (including dirt) on the coated surface of the photocatalytically active coated substrate will be reduced if the surface is illuminated by UV light (including sunlight).

Preferably, the coated glass has a static water contact angle (on the coated side) of 20° or lower. The static water contact angle is the angle subtended by the meniscus of a water droplet on a glass surface and may be determined in a known manner by measuring the diameter of a water droplet of known volume on a glass surface and calculated using an iterative procedure. Freshly prepared or cleaned glass has a hydrophilic surface (a static water contact angle of lower than about 40° indicates a hydrophilic surface), but organic contaminants rapidly adhere to the surface increasing the contact angle. A particular benefit of coated glasses of the present invention is that even if the coated surface is soiled, irradiation of the coated surface by UV light of the right wavelength will reduce the contact angle by reducing or destroying those contaminants. A further advantage is that water will spread out over the low contact angle surface reducing the distracting effect of droplets of water on the surface (e.g. from rain) and tending to wash away any grime or other contaminants that have not been destroyed by the photocatalytic activity of the surface.

Preferably, the coated glass has a haze of 1% or lower, which is beneficial because this allows clarity of view through a transparent coated substrate.

The invention is further illustrated by the following Examples, in which gas volumes are measured at standard temperature and pressure unless otherwise stated. The thickness values quoted for the layers were determined using high resolution scanning electron microscopy (SEM) and/or Xray photoelectron spectroscopy (XPS) depth profiling. XPS was also used to provide information on the surface and bulk elemental composition of the coatings.

The transmission and reflection properties of the coated glasses were determined using a Hitachi U—4000 spectrophotometer. The a, b and L* values mentioned herein of the transmission and/or reflection colours of the glasses refer to the CIE Lab colours. The visible reflection (measured on the coated side unless otherwise stated) and visible transmission of the coated glasses were determined using the D65 illuminant and the standard CIE 2° observer in accordance with the ISO 9050 standard (Parry Moon airmass 2) The haze of the coated glasses was measured using a WYK—Gardner Hazeguard+haze meter.

The photocatalytic activity of the coated glasses was determined from the rate of decrease of the area of the infrared peaks corresponding to C-H stretches of a stearic acid film on the coated surface of the glass under illumination by UVA light or sunlight. The stearic acid film was formed on samples of the glasses, 7–8 cm square, by spin casting 20 μl of a solution of stearic acid in methanol $(8.8 \times 10^{-3}$ mol $dm^{-3})$ on the coated surface of the glass at 2000 rpm for 1 minute. Infra red spectra were measured in transmission, and the peak height of the peak corresponding to the C-H stretches (at about 2700 to 3000 cm$^{-1}$) of the stearic acid film was measured. The photocatalytic activity is expressed in this specification as $t_{90\%}$ (in units of min) which is the time of UV exposure taken to reduce the peak height by 90% (i.e. down to 10% of its initial value). For measurement of photocatalytic activity, the coated side of the glass was illuminated with a UVA lamp (UVA-351 lamp obtained from the Q-Panel Co., Cleveland, Ohio, USA) having a peak wavelength of 351 nm and an intensity at the surface of the coated glass of approximately 32 W/m$^2$ or by sunlight outside on a clear sunny day in June at Lathom, Lancashire, England.

The static water contact angle of the coated glasses was determined by measuring the diameter of a water droplet (volume in the range 1 to 5 μl) placed on the surface of the coated glass as produced, or after irradiation of the coated glass using the UVA 351 lamp for about 2 hours (or as otherwise specified).

Abrasion testing of the coated glass was in accordance with BS EN 1096, in which a sample of size 300 mm×300 mm is fixed rigidly, at the four corners, to the test bed ensuring that no movement of the sample is possible. An unused felt pad cut to the dimensions stated in the standard (BS EN 1096 Part 2 (1999)) is then mounted in the test finger and the finger lowered to the glass surface. A load pressure on the test finger of 4N is then set and the test started. The finger is allowed to reciprocate across the sample for 500 strokes at a speed of 60 strokes/min±6 strokes/min. Upon completion of this abrasion the sample is removed and inspected optically and in terms of photocatalytic activity.

Humidity testing of the coated glasses comprised temperature cycling the coated glass from 35° C. to 75° C. at 100% relative humidity.

In Examples 1 to 10 coatings were deposited on stationary glass samples by chemical vapour deposition.

In Examples 11 to 59 and Comparative Examples A to D, a ribbon of float glass was coated with a two-layer coating as the ribbon advanced over the float bath during the float glass production process. The glass ribbon was coated at the edge across a width of approximately 10 cm.

Layer 1 (the first layer to be deposited on the glass) was a layer of silicon oxide. Layer 1 was deposited by causing a gaseous mixture of coating precursors to contact and flow parallel to the glass surface in the direction of movement of the glass using coating apparatus as described in GB patent specification 1 507 966 (referring in particular to FIG. 2 and the corresponding description on page 3 line 73 to page 4 line 75).

Layer 2 (the second layer to be deposited) was a layer comprising titanium dioxide. Layer 2 was deposited by combining separate gas streams comprising titanium tetrachloride in flowing nitrogen carrier gas, ethyl acetate (EtOAc) in flowing nitrogen carrier gas, tin tetrachloride in flowing nitrogen or dimethyl tin dichloride (DMT) in flowing nitrogen and a bulk flow of nitrogen into a gaseous mixture and then delivering the gaseous mixture to the coating apparatus where it contacted and flowed parallel to the glass surface. Titanium tetrachloride, tin tetrachloride or DMT and ethyl acetate were entrained in separate streams of flowing nitrogen carrier gas by passing nitrogen through bubblers.

Table 1 describes the general deposition conditions used for the series of Examples and Comparative Examples, 11 to 18, 19 to 24, 25 to 59 and A to D.

In Examples 60 to 66, two-layer coatings were applied by on line CVD to a float glass ribbon across its full width of approximately 132 inches (3.35 m) in the float bath during the float glass production process.

The two layer coating consisted of a silicon oxide layer deposited first on the float glass ribbon and tin containing titanium oxide layer deposited on to the silicon oxide layer.

Titanium tetrachloride (TiCl$_4$) and ethyl acetate were entrained in separate nitrogen carrier gas streams. For the evaporation of TiCl$_4$ a thin film evaporator was used. The TiCl$_4$ and ethyl acetate gas streams were combined to form the gaseous mixture used to deposit the titanium oxide layer. This mixing point was just prior to the coater.

Table 2 describes the general deposition conditions used for Examples 60 to 66. In Table 2, slm means standard liters per minute and sccm means standard cc per minute.

TABLE 1

|  | Examples 11 to 18 | Examples 19 to 24 | Examples 25 to 59 Comparative Examples A to D |
|---|---|---|---|
| Linespeed | 135 m/hr | 150 m/hr | 150 m/hr |
| Glass Temperature at TiO$_2$ Coater | ~630° C. | ~630° C. | ~630° C. |
| Glass Temperature at silica coater | 710° C. | 725° C. | 695° C. |
| Silica Undercoat Conditions |  |  |  |
| SiH$_4$ | 24 cc/min | 80 cc/min | 80 cc/min |
| N$_2$ | 8 l/min | 8 l/min | 8 l/min |
| C$_2$H$_4$ | 144 cc/min | 480 cc/min | 240 cc/min |
| O$_2$ | 48 cc/min | 160 cc/min | 80 cc/min |
| TiO$_2$ Conditions |  |  |  |
| TiCl$_4$ Bubbler Temperature | 50° C. | 50° C. | 50° C. |
| N$_2$ to TiCl$_4$ Bubbler | 125 cc/min | 175–200 cc/min | 125–175 cc/min |
| EtOAc Bubbler Temperature | 35° C. | 35° C. | 35° C. |
| N$_2$ to EtOAc Bubbler | 125 cc/min | 175–200 cc/min | 90–210 cc/min |
| Bulk N$_2$ | 10 l/min | 10 l/min | 10 l/min |
| Precursors Used | SnCl$_4$ | SnCl$_4$ | SnCl$_4$ or DMT |

TABLE 2

|  | Examples 60 to 66 |
|---|---|
| Linespeed | 477 inches/min (727 m/hr) |
| Glass Temperature at TiO$_2$ Coater | 680° C.–700° C. |
| Silica Undercoat Conditions (at each of two coaters, temperatures approximately 721° C. and 690° C.) |  |
| SiH$_4$ | 2.3 slm |
| N$_2$ | 285 slm |
| He | 250 slm |
| C$_2$H$_4$ | 12 slm |
| O$_2$ | 8 slm |
| TiO$_2$ Topcoat Conditions |  |
| TiCl$_4$ | 10 sccm |
| EtOAc | 26.7 sccm |
| Bulk He | 300 slm |
| Bulk N$_2$ | 300 slm |
| DMT Precursor | 1.5 g/min to 4 g/min |

Typical conditions for delivery of the tin precursors from bubblers for the Examples are described in Table 3.

TABLE 3

| Precursor | Bubbler Delivery | Bubbler Temperature | Flow rates of Nitrogen carrier gas |
|---|---|---|---|
| Dimethyltin Dichloride-DMT | Blow nitrogen through molten solid | approx. 140° C. | 0–250 cc/min |
| Tin (IV) Chloride-SnCl$_4$ | Blow nitrogen through liquid | approx. 70° C. | 0–700 cc/min |

EXAMPLES 1 TO 10

In Examples 1 to 10, coatings having a two layer alkali ion blocking coating (comprising a tin oxide layer at the glass surface and a silica layer on the tin oxide layer) were deposited on to stationary glass substrates using a laboratory CVD reactor. Titania coatings were deposited using bubblers containing TiCl$_4$ and ethyl acetate (EtOAc) at a TiCl$_4$:EtOAc molar ratio of about 1:3. The deposition conditions were set so as to give 12%–16% visible reflection. General deposition conditions used for Examples 1 to 10 are described in Table 4.

TABLE 4

| | | | |
|---|---|---|---|
| TiCl$_4$ Bubbler Temperature | 65° | N$_2$ to TiCl$_4$ Bubbler | 50 to 200 cc/min |
| EtOAc Bubbler Temperature | 45° | N$_2$ to EtOAc Bubbler | 75 to 200 cc/min |
| Substrate Temperature (Susceptor Reading) | 660° C. | Bulk N$_2$ | 8.5 l/min |
| Temperature of Delivery Lines | 180–200° C. | Coating Period | 10–15 seconds |

Examples 1 to 10 were deposited using a SnCl$_4$ delivery range of 0 to 120 cc/min nitrogen to the SnCl$_4$ bubbler (corresponding to about 0–0.4 g/min).

The specific deposition conditions for Examples 1 to 10 are described in Table 5 together with t$_{90\%}$ for each of the deposited coatings. There was appreciable scatter in the measurements of t$_{90\%}$. Some of this scatter can be explained by a varying film thickness caused by variations in the deposition conditions (e.g. a SnCl$_4$ bubbler temperature of lower than 35° C. and modified carrier gas flows to TiCl$_4$ and EtOAc bubblers).

XPS depth profiling indicated the coatings to be approximately 700 Å thick. Tin was detected throughout the containing coatings at a level of 0.3 atom. % for coatings deposited at 0.08 g/min SnCl$_4$.

TABLE 5

| | N$_2$ Flow Rate to Bubbler | | | |
|---|---|---|---|---|
| Example | TiCl$_4$ (cc/min) | EtOAc (l/min) | SnCl$_4$ (cc/min) | t$_{90\%}$ (min) |
| 1 | 100 | 130 | 20 | 62 |
| 2 | 140 | 140 | 20 | 55 |
| 3 | 200 | 200 | 50 | 90 |
| 4 | 100 | 100 | 20 | 98 |
| 5 | 120 | 100 | 120 | 123 |
| 6 | 140 | 140 | 20 | 48 |
| 7 | 50 | 100 | 50 | 80 |
| 8 | 50 | 100 | 50 | 84 |
| 9 | 60 | 100 | 60 | 151 |
| 10 | 75 | 75 | 75 | 55 |

EXAMPLE 11 TO 18

Examples 11 to 18 were deposited by on line CVD during the float glass production process, at a TiCl$_4$:EtOAc molar ratio of 1:3 and at a relatively low precursor flow (0–0.4 g/min SnCl$_4$). All coatings were deposited on to the silica undercoat and were optimised to give 12–16% visible reflection. The general coating conditions were as described in Table 1 above, the specific coating conditions for each of Examples 11 to 18 are described in Table 6 together with t$_{90\%}$, the visible reflection and the contact angle (static water contact measured after exposure to ultraviolet light (UVA lamp).

TABLE 6

| | Nitrogen carrier gas flow rates to bubbler | | | | Visible | |
|---|---|---|---|---|---|---|
| Example | TiCl$_4$ (cc/min) | EtOAc (cc/min) | SnCl$_4$ (cc/min) | t$_{90\%}$ (min) | Reflection (%) | Contact Angle (°) |
| 11 | 150 | 150 | 20 | 50.5 | 17.27 | 29 |
| 12 | 150 | 150 | 40 | 60 | 18.16 | 14.3 |
| 13 | 150 | 150 | 60 | 127.5 | 18.85 | 18.7 |
| 14 | 150 | 150 | 80 | 111 | 19.26 | 12.1 |
| 15 | 150 | 150 | 100 | 110 | 19.19 | 19.2 |
| 16 | 110 | 110 | 100 | 103 | 13.64 | 10.6 |
| 17 | 110 | 110 | 50 | 67.5 | 13.24 | 12.9 |
| 18 | 110 | 110 | 20 | 77 | 13.4 | 22.2 |

The coatings of Examples 11 to 18 passed a salt spray test, remaining unchanged after 830 hours. Humidity testing of the coatings for Examples 11 to 19 was carried out, the coatings remained unchanged after 200 cycles (the maximum number of cycles performed). In contrast, undoped titania coatings deposited under similar conditions survived only 17 cycles of the humidity test before failing at the SiO$_2$/TiO$_2$ interface.

Abrasion testing on the Examples 11 to 18 showed that tin containing titania coatings were more robust than the undoped $TiO_2$ (to visual examination).

EXAMPLES 19 TO 24

Examples 19 to 24 were deposited by on line CVD during the float glass production process as described in Table 1 above at a relatively high precursor flow (0–2.8 g/min $SnCl_4$). The specific coating conditions for each of Examples 19 to 24 are described in Table 7. The static water contact angle before and after UVA exposure (for approximately 2 hours, the contact angle after UVA exposure is in brackets), $t_{90\%}$ using the UVA lamp and $t_{90\%}$ using sunlight are described in Table 8.

TABLE 7

| Example | $N_2$ to $TiCl_4$ (cc/min) | $N_2$ to EtOAc (cc/min) | $N_2$ to $SnCl_4$ (cc/min) |
| --- | --- | --- | --- |
| 19 | 175 | 175 | 25 |
| 20 | 175 | 175 | 50 |
| 21 | 175 | 175 | 75 |
| 22 | 175 | 175 | 300 |
| 23 | 175 | 175 | 500 |
| 24 | 175 | 175 | 700 |

TABLE 8

| Example | Contact angle before (after) UVA exposure | $t_{90\%}$ (min) UVA | $t_{90\%}$ (min) sunlight |
| --- | --- | --- | --- |
| 19 | 43.4 (3.6) | 95 | 129.5 |
| 20 | 17.8 (7) | 105.5 | 221 |
| 21 | 28.8 (3.6) | 165.5 | 262.5 |
| 22 | 40.9 (11.5) | 116 | 230 |
| 23 | 4 (3.3) | 102 | 154 |
| 24 | 7.6 (4.5) | 139 | 181.5 |

The haze, visible transmission, visible reflection and the transmission and reflection colours of Examples 19 to 24 are described in Table 9.

TABLE 9

| Example | Haze | Transmission | | | | Reflection | | | |
| --- | --- | --- | --- | --- | --- | --- | --- | --- | --- |
| | | % | L* | a* | b* | % | L* | a* | b* |
| 19 | 0.09 | 84.5 | 93.7 | −1 | 4.4 | 15.1 | 45.7 | 0.6 | −12.3 |
| 20 | 0.2 | 82.5 | 92.8 | −1 | 5.3 | 16.3 | 47.4 | 0.6 | −13.1 |
| 21 | 0.13 | 82.9 | 93 | −1 | 5.1 | 15.8 | 46.7 | 0.6 | −12.8 |
| 22 | 0.22 | 82.6 | 92.9 | −1 | 5.3 | 17 | 48.2 | 0.5 | −13.4 |
| 23 | 0.21 | 79.8 | 91.6 | −0.9 | 6.2 | 18.4 | 49.9 | 0.4 | −13.7 |
| 24 | 0.45 | 81.1 | 92.2 | −0.9 | 5.4 | 17.6 | 49 | 0.2 | −12.6 |

Tin concentration within the titania coatings was measured using XPS depth profiling for some Examples and the results are described in Table 10 for particular delivery rates of tin chloride.

TABLE 10

| Example | $TiO_2$ Thickness (Å) | Surface Tin Concentration (atom %) | Bulk Tin Concentration (atom %) |
| --- | --- | --- | --- |
| 17 | 119 | 0.8 | 0.1 |
| 20 | 207 | 0.9 | 0.1 |
| 15 | 215 | 1.1 | 0.2 |
| 23 | 259 | 2.1 | 0.4 |
| 24 | 283 | 4.3 | 1.2 |

Tin was found to be segregated at the top surface with lower levels of tin present in the body of the $TiO_2$.

EXAMPLES 25 TO 59 AND COMPARATIVE EXAMPLES A TO D

Examples 25 to 59 and Comparative Examples A to D were deposited by on line CVD during the glass production process as described above in Table 1. Tin chloride was used as the tin precursor in Examples 25 to 40, DMT as the tin precursor in Examples 41 to 59. No tin precursor was used in the Comparative Examples. The specific coating conditions and visible reflection for Examples 25 to 40 are described in Table 11, for Comparative Examples A to D in Table 12 and for Examples 41 to 59 in Table 13. In each of the Examples 25 to 59 and Comparative Examples A to D, the nitrogen make up was 10 l/min.

TABLE 11

| Examples | $N_2$ to $TiCl_4$ (cc/min) | $N_2$ to EtOAc (cc/min) | $N_2$ to $SnCl_4$ (cc/min) | EtOAc:$TiCl_4$ Ratio | Visible Reflection (%) |
| --- | --- | --- | --- | --- | --- |
| 25 | 175 | 130 | 10 | 3 | 25.15 |
| 26 | 175 | 130 | 30 | 3 | 26.21 |
| 27 | 175 | 130 | 50 | 3 | 25.92 |
| 28 | 175 | 130 | 70 | 3 | 26.41 |
| 29 | 175 | 130 | 100 | 3 | 26.51 |
| 30 | 175 | 210 | 100 | 5 | 23.5 |
| 31 | 175 | 210 | 70 | 5 | 23.58 |
| 32 | 175 | 210 | 50 | 5 | 23.71 |
| 33 | 175 | 210 | 30 | 5 | 23.55 |
| 34 | 175 | 210 | 10 | 5 | 22.69 |
| 35 | 175 | 175 | 10 | 4 | 24.42 |
| 36 | 175 | 175 | 30 | 4 | 25.3 |
| 37 | 175 | 175 | 50 | 4 | 25.61 |
| 38 | 150 | 150 | 30 | 4 | 21.16 |

TABLE 11-continued

| Examples | $N_2$ to $TiCl_4$ (cc/min) | $N_2$ to EtOAc (cc/min) | $N_2$ to $SnCl_4$ (cc/min) | EtOAc:$TiCl_4$ Ratio | Visible Reflection (%) |
|---|---|---|---|---|---|
| 39 | 125 | 125 | 30 | 4 | 19.2 |
| 40 | 175 | 90 | 30 | 2 | 29.47 |

TABLE 12

| Comparative Examples | $N_2$ to $TiCl_4$ | $N_2$ to EtOAc | EtOAc:$TiCl_4$ Ratio | Visible reflection (%) |
|---|---|---|---|---|
| A | 250 | 170 | 3 | 19.26 |
| B | 250 | 280 | 5 | 17.2 |
| C | 250 | 110 | 2 | 26 |
| D | 175 | 175 | 4 | 13.79 |

TABLE 13

| Examples | $N_2$ to $TiCl_4$ | $N_2$ to EtOAc | $N_2$ to DMT | EtOAc:$TiCl_4$ Ratio | Visible reflection (%) |
|---|---|---|---|---|---|
| 41 | 175 | 130 | 10 | 3 | 14.67 |
| 42 | 175 | 130 | 30 | 3 | 19.13 |
| 43 | 175 | 130 | 50 | 3 | 19.48 |
| 44 | 175 | 130 | 70 | 3 | 19.21 |
| 45 | 175 | 130 | 100 | 3 | 18.9 |
| 46 | 175 | 210 | 100 | 5 | 16.76 |
| 47 | 175 | 910 | 70 | 5 | 17.9 |
| 48 | 175 | 210 | 50 | 5 | 18.54 |
| 49 | 175 | 210 | 30 | 5 | 19.29 |
| 50 | 175 | 210 | 10 | 5 | 18.7 |
| 51 | 175 | 90 | 10 | 2 | 23 |
| 52 | 175 | 90 | 30 | 2 | 23.5 |
| 53 | 175 | 90 | 50 | 2 | 23 |
| 55 | 175 | 90 | 100 | 2 | 22.14 |
| 56 | 175 | 175 | 30 | 4 | 20.36 |
| 57 | 175 | 175 | 50 | 4 | 20.13 |
| 58 | 175 | 175 | 70 | 4 | 20.05 |
| 59 | 175 | 130 | 260 | 3 | 18 |

The coated glasses of Examples 24 to 59 and Comparative Examples A to D were tested for durability using the European surface #1 abrasion test (i.e. European standard abrasion test). Coatings were abraded for 500 strokes and $t_{90\%}$, and the static water contact angle (to determine the hydrophilic nature of the surface) were measured before and after abrasion and the coatings were examined visually after abrasion.

Values of $t_{90\%}$ before and after abrasion and contact angle before and after abrasion (the values after abrasion are in brackets) together with the results of visual examination (visual) and examination as to the hydrophilicity (hydro) after abrasion of the coatings for Examples 25 to 40 are described in Table 14, for Comparative Examples A to D in Table 15 and for Examples 41 to 59 in Table 16. The static water contact angles were determined after exposure to sunlight for 24 hours. The results of visual examination and examination as to the hydrophilicity of the coatings after abrasion are reported in accordance with the key: Visual, 1=No Damage, 2=Damage, 3=Coating Removed; hydrophilicity, 1=hydrophilic, 2=slightly patchy, 3=patchy, 4=fail.

TABLE 14

| Examples | Abrasion Result Visual | Abrasion Result Hydro | $t_{90\%}$ before and (after) abrasion | Contact Angle before and (after) abrasion |
|---|---|---|---|---|
| 25 | 2 | 1 |  | 12.1 (19.7) |
| 26 | 1 | 1 | 72 (121) | 5.4 (14.4) |
| 27 | 1 | 1 | 69 (73) | 6.4 (6.4) |

TABLE 14-continued

| Examples | Abrasion Result Visual | Abrasion Result Hydro | $t_{90\%}$ before and (after) abrasion | Contact Angle before and (after) abrasion |
|---|---|---|---|---|
| 28 | 1 | 1 | 76 (177) | 12.4 (21.4) |
| 29 | 1 | 1 | 84 (43) | 3.4 (24.1) |
| 30 | 1 | 2 | 121 (200) | 8 (6.2) |
| 31 | 1 | 1 | 90 (97) | 22.2 (17.7) |
| 32 | 1 | 1 | 67 (127) | 7.2 (24.5) |
| 33 | 1 | 1 | 94 (132) | 5.4 (5.4) |
| 34 | 1 | 2 | 42 (95) | 8 (11.5) |
| 35 | 1 | 1 | 84 (889) | 13.5 (19.5) |
| 36 | 1 | 1 | 47 (103) | 3 (3) |
| 37 | 1 | 1 | 58 (97) | 6.6 (5.8) |
| 38 | 1 | 1 | 130 (128) | 33.2 (14.9) |
| 39 | 1 | 1 | 68 (91) | 1.8 (8.4) |
| 40 | 1 | 1 | 134 (1109) | 3.7 (12.5) |

TABLE 15

| Comparative Examples | Abrasion Result Visual | Abrasion Result Hydro | $t_{90\%}$ before and (after) abrasion | Contact Angle before and (after) abrasion |
|---|---|---|---|---|
| A | 2.5 | 4 | 11 (2210) | 5.7 (26) |
| B | 2.5 | 2 | 91 (1430) | 3.4 (24.5) |
| C | 2.5 | 1 | 17 | 8 (28.4) |
| D | 2.5 | 2 | 114 | 10.4 (18.4) |

TABLE 16

| Examples | Abrasion Result Visual | Abrasion Result Hydro | $t_{90\%}$ before and (after) abrasion | Contact Angle before and (after) abrasion |
|---|---|---|---|---|
| 41 | 1 | 1 | 43 (1275) | 11.6 (8.1) |
| 42 | 1 | 1 | 41 (1169) | 9.9 (10.6) |
| 43 | 1 | 3 | 38 (160) | 13.7 (23.9) |
| 44 | 1 | 1 | 40 (220) | 14.7 (7) |
| 45 | 1 | 1 | 38 (27) | 4.6 (15.9) |
| 46 | 1 | 1 | 39 (32) | 10.2 (10.2) |
| 47 | 1 | 1 | 54.5 (188) | 6.3 (6) |
| 48 | 1 | 1 | 42 (39) | 11.9 (14.5) |
| 49 | 1 | 1 | 50 (1085) | 15.1 (14.4) |
| 50 | 1 | 1 | 76 (1055) | 27.9 (20.9) |
| 51 | 2 | 2 | 19 (975) | 33.2 (21.6) |
| 52 | 1 | 1 | 30 (1095) | 5.4 (18.1) |
| 53 | 1.5 | 1 | 90 (31) | 18.6 (26.4) |
| 55 | 1 | 1 | 32 (295) | 9.9 (8.4) |
| 56 | 1 | 1 | 42 (2350) | 15.1 (11.5) |
| 57 | 1 | 1 | 51 (82) | 7.8 (6.7) |
| 58 | 1 | 1 | 86 (1110) | 17.5 (17.3) |
| 59 | 1 | 3 | 38 (99) | 10.4 (26) |

XPS analysis of the tin containing coatings indicated tin segregation at the surface of the coating with a lower tin content measured in the bulk of the titania coating. This was observed with both $SnCl_4$ and DMT. Summary measurements are shown in Table 17 below.

TABLE 17

| Tin Precursor flow rate | EtOAc:TiCl$_4$ Molar Ratio | Surface tin concentration (atom %) | Bulk tin concentration (atom %) |
|---|---|---|---|
| 0.12 g/min SnCl$_4$ | 3:1 | 0.4 to 0.9 | 0.1 |
| 0.28 g/min SnCl$_4$ | 3:1 | 0.7 to 1.2 | 0.1 to 0.3 |
| 0.28 g/min SnCl$_4$ | 5:1 | 0.6 to 1.2 | 0.1 to 0.4 |
| 0.12 g/min DMT | 3:1 | 0.8 to 1.5 | 0.1 to 0.3 |

EXAMPLES 60 TO 66

Examples 60 to 66 were deposited by on line CVD during the float glass production process across the full width of a float glass ribbon as described above in Table 2. DMT was used as the tin precursor. The flow rates of DMT used for each of the Examples 60 to 66 are described in Table 18, together with values of $t_{90\%}$ and static water contact angle before and after 500 abrasion strokes in accordance with the European standard abrasion after abrasion are in brackets).

TABLE 18

| Example | DMT flow (cc/min) | $t_{90\%}$ before and (after) abrasion | Contact Angle before and (after) abrasion |
|---|---|---|---|
| 60 | 2.5 | 30 (1240) | 21.1 (21.1) |
| 61 | 5 | 51 (1240) | 14.7 (13) |
| 62 | 7.5 | 31 (560) | 6.7 (8.2) |
| 63 | 10 | 25 (2540) | 7.9 (13.1) |
| 64 | 12.5 | 87 (1240) | 6.4 (6.6) |
| 65 | 15 | 70 (1280) | 16 (16) |
| 66 | 20 | 50 (1630) | 20.3 (17.5) |

$t_{90\%}$ was measured after the coatings were exposed to sunlight for 24 hours.

Examination by scanning electron microscopy (SEM) showed that after abrasion, coatings with no tin were highly furrowed and many parallel abrasion marks were scored into the surface of the coating. There was also a small loss in coating thickness. By comparison tin containing coatings were marked less, there was no significant loss in thickness, and the coating surface appeared smooth.

The optical properties of the coatings were investigated before and after abrasion. The visible transmission and transmission colours of the Examples 60 to 66 are described in Table 19, the visible reflection and colours in reflection are described in Table 20 (in Table 19 and Table 20 the values after abrasion are in brackets).

TABLE 19

| Example | Visible Transmission before and (after) abrasion (%) | L* before and (after) abrasion (transmission) | a* before and (after) abrasion (transmission) | b* before and (after) abrasion (transmission) |
|---|---|---|---|---|
| 60 | 85.8 (85.2) | 94.2 (94) | −1.1 (−1.1) | 3 (3) |
| 61 | 86 (85.6) | 94.3 (94.1) | −1.1 (−1.1) | 2.9 (2.7) |
| 62 | 84.1 (83.8) | 93.5 (93.3) | −1.1 (−1.1) | 3.7 (3.6) |
| 63 | 84.8 (84.6) | 93.8 (93.7) | −1.1 (−1.1) | 3.4 (3.2) |
| 64 | 84.6 (84.7) | 93.7 (93.8) | −1.1 (−1.1) | 3.6 (3.2) |
| 65 | 85.1 (84.3) | 93.9 (93.6) | −1.1 (−1.1) | 3.4 (3.4) |
| 66 | 84.1 (83.9) | 93.5 (93.4) | −1.1 (−1.1) | 3.8 (3.6) |

TABLE 20

| Example | Visible Reflection before and (after) abrasion (%) | L* before and (after) abrasion (reflection) | a* before and (after) abrasion (reflection) | b* before and (after) abrasion (reflection) |
|---|---|---|---|---|
| 60 | 13.3 (13.1) | 43.2 (43) | 0.4 (0.3) | −10 (−8.7) |
| 61 | 12.6 (12.9) | 42.2 (42.6) | 0.4 (0.3) | −8.4 (−8.1) |
| 62 | 14.9 (15.2) | 45.4 (45.9) | 0.4 (0.4) | −11.2 (−10) |
| 63 | 14 (13.8) | 44.2 (44) | 0.3 (0.3) | −10.4 (−8.9) |
| 64 | 14 (14.1) | 44.2 (44.4) | 0.4 (0.4) | −10.6 (−9.3) |
| 65 | 13.8 (14.1) | 44 (44.4) | 0.3 (0.3) | −10.8 (−9.3) |
| 66 | 14.9 (14.8) | 45.5 (45.3) | 0.3 (0.4) | −11.3 (−9.8) |

The coatings were analysed by XPS profiling and the results of XPS of the thickness of the silica undercoat and the titania layer, together with the surface and bulk elemental analyses for tin and carbon, are described in Table 21.

TABLE 21

| Example | $SiO_2$ Undercoat Thickness (Å) | $TiO_2$ Thickness (Å) | Surface Composition (atom %) | | Bulk Composition (atom %) | |
|---|---|---|---|---|---|---|
| | | | Sn | C | Sn | C |
| 60 | 293 | 242 | 0.2 | 34.0 | 0.07 | 8.7 |
| 61 | 293 | 220 | 0.3 | 11.6 | 0.12 | 2.8 |
| 62 | 293 | 242 | 0.5 | 18.0 | 0.06 | 2.6 |
| 63 | 293 | 242 | 0.4 | 16.9 | 0.05 | 1.4 |
| 64 | 297 | 255 | 0.5 | 47.1 | 0.13 | 11.2 |
| 65 | 300 | 242 | 0.6 | 17.3 | 0.12 | 1.7 |
| 66 | 375 | 352 | 0.5 | 33.2 | 0.13 | 8.2 |

The invention claimed is:

1. A process for the production of a durable photocatalytically active self-cleaning coated glass comprising contacting the surface of a hot glass substrate with a fluid mixture comprising titanium chloride a source of oxygen and a tin precursor thereby depositing a tin containing titanium oxide coating on the surface of the glass substrate wherein there is a greater atomic percent tin in the surface of the tin containing titanium oxide coating than there is in the bulk of the coating.

2. A process as claimed in claim 1 wherein at least part of the fluid mixture contacts the surface of the glass substrate by flowing over the glass surface.

3. A process as claimed in claim 1 wherein titanium chloride comprises titanium tetrachloride.

4. A process as claimed in claim 1 wherein the tin precursor comprises a tin halide.

5. A process as claimed in claim 4 wherein the tin halide comprises a tin chloride.

6. A process as claimed in claim 5 wherein the tin chloride comprises dimethyl tin dichloride or tin tetrachloride.

7. A process as claimed in claim 1 wherein the source of oxygen comprises an ester.

8. A process as claimed in claim 7 wherein the ester comprises a carboxylic acid ester.

9. A process as claimed in claim 8 wherein the carboxylic acid ester comprises a $C_1$ to $C_4$ acetate.

10. A process as claimed in claim 9 wherein the $C_1$ to $C_4$ acetate comprises ethyl acetate.

11. A process as claimed in claim 1 wherein the glass substrate comprises a soda-lime-silicate glass substrate.

12. A process as claimed in claim 11 further comprising depositing an alkali blocking underlayer on the surface of the glass substrate before depositing the tin containing titanium oxide coating.

13. A process as claimed in claim 1 wherein the fluid mixture comprises a gaseous mixture.

14. A process as claimed in claim 1 wherein the hot glass substrate is at a temperature in the range 500° C. to 750° C.

15. A process as claimed in claim 14 wherein the hot glass substrate is at a temperature in the range 570° C. to 650° C.

16. A process as claimed in claim 1 wherein the process is performed during the float glass production process.

17. A process as claimed in claim 16 wherein the process is performed in the float bath.

18. A process as claimed in claim 1 wherein the amount of tin in the bulk of the tin containing titanium oxide coating is below 10 atom %.

19. A process as claimed in claim 18 wherein the amount of tin in the bulk of the tin containing titanium oxide coating is below 5 atom %.

20. A process as claimed in claim 19 wherein the amount of tin in the bulk of the tin containing titanium oxide coating is below 2 atom %.

21. A process as claimed in claim 1 wherein the atomic percent tin in the surface of the tin containing titanium oxide coating is at least twice that in the bulk of the coating.

22. A process according to claim 1 wherein the amount of tin in the bulk of the tin containing titanium oxide coating is below 10 atomic percent.

23. A durable photocatalytically active coated glass comprising a glass substrate having a coating comprising tin containing titanium oxide, the amount of tin in the bulk of the coating being below 10 atomic percent and the atomic percent tin in the surface of the coating is at least twice that in the bulk of the coating.

24. A durable photocatalytically active glass according to claim 23 wherein the atomic percent tin in the surface of the coating is above 0.05%.

25. A durable photocatalytically active glass according to claim 23 wherein the amount of tin in the bulk of the coating is in the range of 0.05 atomic percent to 5 atomic percent.

* * * * *